2,979,513
Patented Apr. 11, 1961

2,979,513
2-MERCAPTOHYDROQUINONE CONDENSATION PRODUCTS

George E. P. Smith, Jr., Akron, Ohio, assignor to The Firestone Tire & Rubber Company, Akron, Ohio, a corporation of Ohio No Drawing. Filed June 10, 1957, Ser. No. 664,466

4 Claims. (Cl. 260—327)

This invention relates to new condensation products. The new products are formed by condensing 2-mercaptohydroquinone with an aldehyde or ketone. They have the general formula

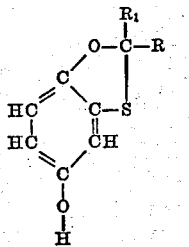

in which R is an alkyl group, straight or branched chain, of one to twelve carbon atoms or a cycloalkyl group, and $R_1$ is hydrogen or an alkyl group, straight or branched chain, of one to twelve carbon atoms or a cycloalkyl group.

The aldehydes and ketones which can be used in preparing the condensation products include, for example, formaldehyde, trioxane, acetaldehyde, paraldehyde, propionaldehyde, the butyraldehydes, the hexaldehydes, including cyclohexyl aldehyde, the octyl aldehydes, the nonylaldehydes, the decyl aldehydes, the dodecyl aldehydes, the tridecylaldehydes, acetone, methyl ethyl ketone, methyl isobutyl ketone, diisobutyl ketone, didodecyl ketone, propiophenone, methyl hexyl ketone, dioctyl ketones, etc.

Any usual method of condensation, as by heating in the presence of a mineral acid or other dehydrating or condensing agent can be employed. The examples given herein are illustrative.

2-mercaptohydroquinone may be prepared as follows:

2-mercaptohydroquinone

To a solution of 148 g. (0.6 mole) of sodium thiosulfate in 300 ml. of water at 0° C. was added dropwise with mechanical stirring 43.2 g. (0.4 mole) of p-benzoquinone in 200 ml. of glacial acetic acid. The resulting light brown solution was diluted with a solution of 800 ml. of concentrated hydrochloric acid and 400 ml. of water. The mixture became slightly milky. It was heated to 40° C., and then, without further heating, was mechanically stirred and treated with 200 g. of zinc powder, the temperature being regulated at 45–46° C. by the rate of addition of zinc. The mixture was cooled and extracted with ether. The ether was evaporated and the residue was dried further in a vacuum desiccator over potassium hydroxide. The liquid partially crystallized to give 32 g. of slightly yellow-white powder, M.P. 116–118° C., on filtration. The filtrate yielded 9.5 g., M.P. 114–115° C.

The following examples illustrate the preparation of various condensation products.

EXAMPLE 1

2-mercaptohydroquinone-acetaldehyde

A mixture of 10 g. (0.07 mole) of 2-mercaptohydroquinone, 70 ml. of water and 5 ml. of concentrated sulfuric acid was gradually treated at room temperature with 3.5 g. (0.08 mole) of paraldehyde. About half of the mercaptohydroquinone dissolved. The remainder appeared to have liquefied. On adding another 5 ml. portion to sulfuric acid, the clear pale brown supernatant liquid became milky. The mixture was heated on the steam bath with stirring. When the temperature reached 47° C. the oil solidified. The mixture was cooled, filtered and dried in vacuo to give 10 g. of crude product or 2.8 g., M.P. 139–141° C. after three recrystallizations from ether-petroleum ether.

EXAMPLE 2

2-mercaptohydroquinone-isobutyraldehyde

To 10 g. (0.07 mole) of 2-mercaptohydroquinone in 100 ml. of water (complete solution at room temperature) was added 5 g. (0.07 mole) of isobutyraldehyde and 1 g. of concentrated sulfuric acid. As no evidence of reaction, such as a temperature rise, occurred after 30 minutes at room temperature, the mixture was heated under reflux for two hours on the steam bath and allowed to stand overnight. The crystalline solid which separated was filitered and air-dried; wt. 11.7 g.; M.P. 128–130° C. The melt was dark red. Recrystallization gave in two crops 5.1 g. of slightly grey-white solid, M.P. 145–147° C.

EXAMPLE 3

2-mercaptohydroquinone-acetone

To 20 g. (0.14 mole) of 2-mercaptohydroquinone in 200 ml. of water was added 9.0 g. (0.15 mole) of anhydrous acetone and 2 ml. of concentrated sulfuric acid. The pale yellow solution resulting was heated on the steam bath under reflux for 17 hours and cooled under the tap. A yellow somewhat viscous oil separated. The mixture was poured into a separatory funnel and the oil was drained off, dissolved in ether, dried over anhydrous sodium sulfate, filtered and the ether evaporated. The residual oil was dissolved in a small amount of ether and precipitated by pouring the ether solution into 750 ml. of petroleum ether. This was repeated four times to give 7.0 g. of a slightly yellow powder which melted at 100–103° C. to a cloudy liquid clearing at 110° C.

EXAMPLE 4

2-mercaptohydroquinone-3,5,5-trimethylhexaldehyde (nonylaldehyde)

A mixture of 10 g. (0.07 mole) of 2-mercaptohydroquinone and 10 g. (0.07 mole) of 3,5,5-trimethylhexaldehyde in 100 ml. of water was treated with one ml. of concentrated sulfuric acid. The temperature rose 5° C. The mixture was heated under reflux on a steam bath for three hours, allowed to stand overnight at room temperature, heated one hour as before and allowed to stand three days at room temperature. The mixture consisted of two liquid layers, an upper colorless layer and a lower yellow oily layer. The upper layer was poured off and discarded. The lower layer was dissolved in ether washed with water (3 portions of 50 ml. each) and dried with anhydrous sodium sulfate. The oil was recovered from the ether solution by filtering off the sodium sulfate and evaporating the ether. The oil was purified by precipitating it successively, from concentrated ether and benzene solutions with petroleum ether. The purified product was a slightly yellow powder weighing 7.0 g.

The condensation products were tested in rubber and were found to have both antioxidant and antiozonant properties. The following is representative of a rubber stock in which they have such properties and was used in the tests reported herein:

| | Part by weight |
|---|---|
| Natural rubber | 100.00 |
| Zinc oxide | 70.00 |
| Titanium oxide | 20.00 |
| Ultramarine blue | 0.20 |
| Stearic acid | 1.20 |
| Sulfur | 3.00 |
| Accelerator | 0.90 |
| Wax | 2.00 |
| Condensation product | 1.00 |
| | 198.30 |

Dumbell strips of stocks containing condensation products of the various examples were cured for 60 minutes at 280° F. and their physical properties determined. Cured strips were aged 2 days at 212° F. in an air oven, and their properties determined. Cured strips were also tested for oxygen absorption, and the physical properties were determined after this test. In reporting the results of the oxygen-absorption test, the first two lines refer to the time required for the absorption of 5 and 10 milliliters, respectively, per gram of rubber hydrocarbon. The fourth line refers to the total amount of oxygen absorbed per gram of rubber hydrocarbon during the time in the absorption apparatus. The fifth line refers to the slope of the straight-line portion of the absorption curve.

In reporting the test results in the following tables, tensile strength, elongation and modulus are expressed in pounds per square inch. In each table, stocks containing various condensation products identified by the examples illustrating their preparation are compared with a control stock containing 2-mercaptohydroquinone. One part of each of the test materials was added to the masterbatch for each test.

TABLE I

| | Control | Sample 1 | Sample 2 | Sample 3 |
|---|---|---|---|---|
| Masterbatch | 197.3 | 197.3 | 197.3 | 197.3 |
| Control | 1.0 | | | |
| Example 1 | | 1.0 | | |
| Example 2 | | | 1.0 | |
| Example 4 | | | | 1.0 |
| Normal Properties: | | | | |
| Modulus 300% | 525 | 475 | 450 | 475 |
| Modulus 400% | 1,050 | 875 | 850 | 875 |
| Tensile | 3,650 | 3,075 | 3,450 | 3,225 |
| Elongation | 630 | 600 | 630 | 630 |
| Oxygen Absorption, 90° C.: | | | | |
| Hrs. for absorption, 5 ml | 22 | 30 | 38 | 41.5 |
| Hrs. for absorption, 10 ml | 46 | 59.5 | | |
| Hrs. in apparatus | 70 | 70 | 70 | 70 |
| Total per gm. rubber | 16.4 | 12.2 | 9.6 | 8.9 |
| Slope of curve | 0.171 | 0.123 | 0.095 | 0.092 |

The various samples showed good antioxidant properties. Sample 3, for example, which contained the nonylaldehyde derivative (Example 4) took almost twice as long as the control to absorb 5 ml. of oxygen, and the total oxygen absorbed in 70 hours was little more than half of that absorbed by the control. The results with the other condensation products show they are effective antioxidants.

TABLE II

| | Control | Sample 4 |
|---|---|---|
| Masterbatch | 197.3 | 197.3 |
| Control | 1.0 | |
| Example 3 | | 1.0 |
| Normal Properties: | | |
| Modulus 300% | 600 | 575 |
| Modulus 400% | 1,225 | 1,150 |
| Tensile | 3,600 | 3,275 |
| Elongation | 600 | 590 |
| Oxygen Absorption, 90° C.: | | |
| Hrs. for absorption, 5 ml | 36.5 | 45.0 |
| Hrs. for absorption, 10 ml | 65.5 | 84.0 |
| Hrs. in apparatus | 95.0 | 95.0 |
| Total per gram rubber | 15.8 | 13.0 |
| Slope of curve | 0.152 | 0.115 |

Although the test strips all contained one part of the antioxidant per 100 parts of rubber, different amounts will be used in rubbers, alone and mixed with other stabilizers, depending upon the nature and use of the products made from the rubbers. A relatively small amount, from 0.1 to 10.0 percent based on the weight of rubber hydrocarbon, will be used.

Test strips were subjected to ozone under stress to determine the antiozonant effect of the compounds. The apparatus and method of testing are described in articles by Ford and Cooper in India Rubber World 124, 696 (September 1951), and 125, 55 (October 1951). Cracking due to ozone action was inhibited by the compounds.

Although the tests refer more particularly to the use of the condensation products in natural rubber, they are stabilizers in other rubbers including those obtained by the homopolymerization or copolymerization of vinyl monomers and other monomers, including, for example, GR–S which is a copolymer of butadiene and styrene; nitrile rubbers which are copolymers of butadiene and acrylonitrile; Neoprenes which are polychloroprenes; polyisoprenes, etc.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e.g., cyclohexyl benzothiazole sulfenamide, thiazoline sulfenamides, thiocarbamyl sulfenamides, mercaptothiazoles, mercaptothiazolines, thiazolyl mono- and disulfides, the dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned where desired, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzothiazole, zinc dimethyl dithiocarbamate, and zinc dibutyl dithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

The invention is covered in the claims which follow. What I claim is:

1. A compound represented by the following formula:

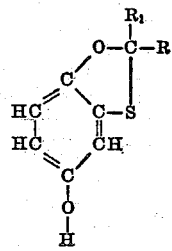

in which R is an alkyl of one to twelve carbon atoms and $R_1$ is selected from the class consisting of hydrogen and alkyl of one to twelve carbon atoms.

2. A compound of claim 1 in which R is alkyl and $R_1$ is hydrogen.

3. A compound of claim 1 in which R is octyl and $R_1$ is hydrogen.

4. The chemical compound of claim 1 in which R is 2,4,4-trimethylpentyl and $R_1$ is hydrogen.

References Cited in the file of this patent

UNITED STATES PATENTS

| | | |
|---|---|---|
| 1,899,058 | Reed | Feb. 28, 1933 |
| 2,200,525 | Winans | May 14, 1940 |
| 2,451,818 | Flowers et al. | Oct. 19, 1948 |
| 2,734,052 | Dittmar | Feb. 7, 1956 |
| 2,807,627 | Putter et al. | Sept. 24, 1957 |

FOREIGN PATENTS

| | | |
|---|---|---|
| 913,177 | Germany | June 10, 1954 |
| 920,129 | Germany | Nov. 15, 1954 |
| 1,081,339 | France | Dec. 17, 1954 |

OTHER REFERENCES

Djerassi et al.; J. Am. Chem. Soc. 77, pp. 568–72 (1955).